(No Model.)
D. W. CROWTHER.
HORSE HITCHING DEVICE.
No. 316,878.            Patented Apr. 28, 1885.
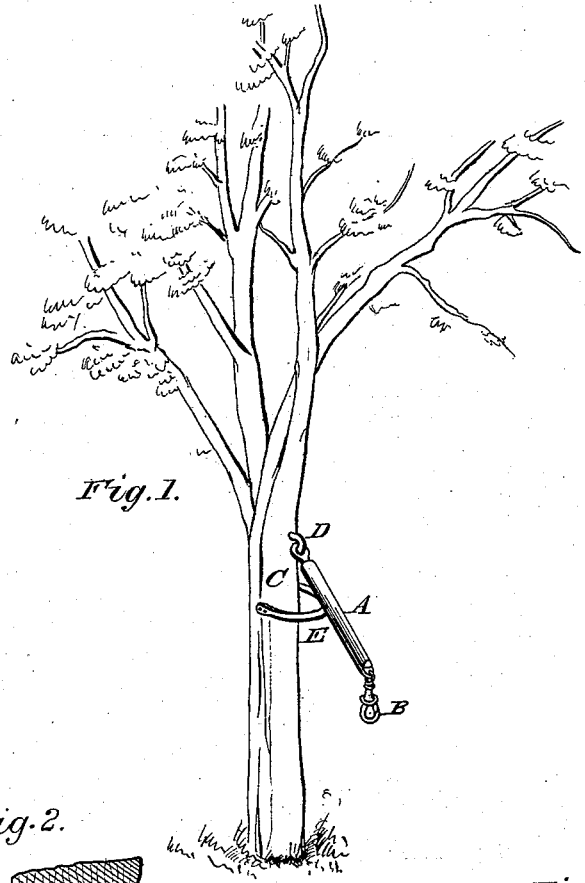
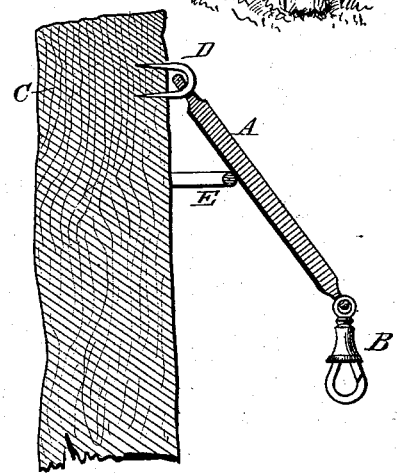
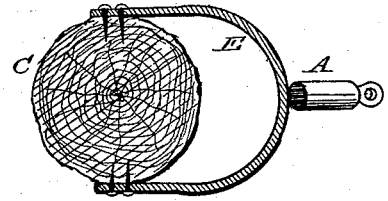
WITNESSES:
Fred. G. Dieterich,
Wm. H. Bagger.
David W. Crowther,
INVENTOR.
by Louis Bagger & Co.
ATTORNEYS.
N. PETERS, Photo-Lithographer, Washington, D. C.

UNITED STATES PATENT OFFICE.

DAVID W. CROWTHER, OF HAGERSTOWN, MARYLAND.

HORSE-HITCHING DEVICE.

SPECIFICATION forming part of Letters Patent No. 316,878, dated April 28, 1885.

Application filed June 28, 1884. (No model.)

*To all whom it may concern:*

Be it known that I, DAVID W. CROWTHER, a citizen of the United States, and a resident of Hagerstown, in the county of Washington and State of Maryland, have invented certain new and useful improvements in Horse-Hitching Devices, and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hitching-bar, showing the same attached in position for operation to the trunk of a tree. Fig. 2 is a vertical sectional view of the same; and Fig. 3 is a horizontal sectional view.

The same letters refer to the same parts in all the figures.

This invention relates to an improved hitching-bar, adapted to be attached to the trunk of a tree, and having for its object to prevent the horses hitched thereto from gnawing and injuring the bark of the same.

To this end it consists in the improved construction and arrangement of parts, which will be hereinafter fully described, and particularly pointed out in the claim.

In the drawings hereto annexed, A designates the hitching-bar, which consists of an iron rod of suitable length, say about two feet. The said bar is provided at its outer end with a swiveled snap-hook, B, of suitable construction, and its upper end is connected securely to the tree-trunk C by means of a staple, D, or some other suitable fastening device.

E designates a hoop or bail attached to opposite sides of the tree, and extending in front of the trunk, some distance below the point at which the hitching-bar is attached to the latter. It will be seen that this bail will serve to hold the hitching-bar some distance out from the tree-trunk, no matter what the position of the hitching-bar may be, and thus prevent the bar from scraping or otherwise injuring the exterior of the tree when it is not in use, and consequently pending, the accidental swinging of the bar or the dropping of the bar after unhitching the animal being liable to injure the side of the tree.

The operation of this invention is obvious. The hitching-bar is connected to one of the harness-rings by means of the snap-hook. It will thus be seen that the horse has sufficiently free play for his head, while at the same time it is utterly impossible for him to reach and in any way injure the bark or the tree to which he is hitched.

I am aware that it is not broadly new to have a snap-hook or similar attachment for hitching a horse at the end of a bar movably connected to a tree, and I do not wish to claim such construction broadly; but

What I claim is—

The combination, with a tree having a hitching-bar hinged to it provided with means at its outer end for attaching it to the bridle or halter of an animal, of a guard bail or fender secured to the tree below the bar, whereby the tree is guarded against injury from the pending bar, as and for the purpose set forth.

In testimony that I claim the foregoing as my own I have hereunto affixed my signature in presence of two witnesses.

DAVID W. CROWTHER.

Witnesses:
JOHN H. COOK,
JOHN E. WHITE.